United States Patent Office 3,449,341
Patented June 10, 1969

3,449,341
PROCESS FOR THE PREPARATION OF PYRAZINOYLGUANIDINES
Peter I. Pollak, Scotch Plains, and Roger J. Tull, Metuchen, N.J., assignors to Merck & Co., Inc., Rahway, N.J., a corporation of New Jersey
No Drawing. Filed Apr. 30, 1968, Ser. No. 725,504
Int. Cl. C07d 51/76; A61k 27/00
U.S. Cl. 260—250          4 Claims

ABSTRACT OF THE DISCLOSURE

A process is described for the preparation of pyrazinoylguanidines which comprises the treatment of the corresponding pyrazinimidoylguanidines with acid. The products have utility as diuretic and/or saluretic agents with potassium sparing properties.

---

This invention is concerned with a novel process for the preparation of 3,5-diamino-6-halopyrazinoylguanidine compounds which possess useful diuretic properties, but more importantly they selectively enhance the excretion of sodium and chloride ions while suppressing the excretion of potassium. The products prepared by the novel process of this invention are especially useful in the treatment or management of edema and other abnormalities resulting from the retention of excess quantities of sodium and/or fluid by the animal organism.

The novel process of this invention involves the reaction of a 3,5-diamino-6-halopyrazinimidoylguanidine, I, with a mineral acid to give the desired 3,5-diamino-6-halopyrazinoylguanidine, II. The reaction is represented by the following equation:

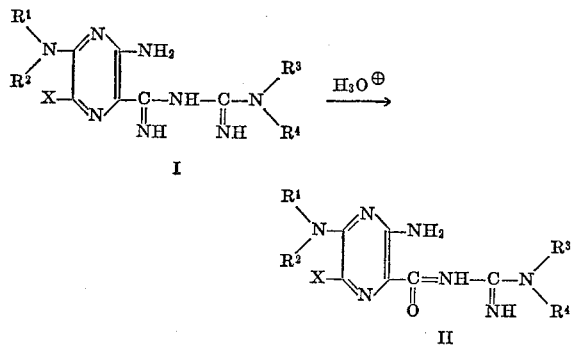

The reaction comprises dissolving Compound I in a solution of a mineral acid such as hydrochloric, hydrobromic, sulfuric and the like, of acid strength from 1 to about 12 normal, preferably containing at least one equivalent of acid per mole of Compound I. The acid solution can be aqueous or aqueous alcohols such as methanol, ethanol, propanol or isopropanol. After standing for from 1 to about 10 hours at room temperature of from 1 to about 3 hours at temperatures up to the reflux temperature of the solvent, the crystalline acid addition salt of 3,5-diamino-6-halopyrazinoylguanidine crystallizes from the solution.

While the novel method of this invention can be employed to produce substantially any 3,5-diamino-6-halopyrazinoylguanidine product the reaction is particularly useful in the preparation of products of Formula II wherein $R^1$ represents
  (a) hydrogen,
  (b) lower alkyl of from 1 to about 5 carbon atoms such as methyl, ethyl, propyl, butyl and pentyl, either straight or branched chain and either unsubstituted or substituted with lower cycloalkyl, having from 1 to 6 carbon atoms such as cyclopropyl, cyclopentyl and cyclohexyl, and
  (c) lower alkenyl;

$R^2$ represents
  (a) hydrogen, and
  (b) lower alkyl of from 1 to about 3 carbon atoms such as methyl, ethyl and propyl;

$R^3$ represents
  (a) hydrogen,
  (b) lower alkyl of from 1 to about 3 carbon atoms such as methyl, ethyl or propyl, either unsubstituted or substituted with such as hydroxyl, or mononuclear aryl, especially phenyl;

$R^4$ represents
  (a) hydrogen, or
  (b) lower alkyl from 1 to about 3 carbon atoms such as methyl, ethyl, and propyl;

and X represents
  (a) hydrogen, or
  (b) halo such as chloro, bromo and iodo.

While the following examples illustrate the novel process of this invention, it is to be understood that the examples are not to be considered as limiting the invention to the particular products prepared or to the particular embodiments of the invention falling within the scope of the reaction conditions and products described herein above.

EXAMPLE 1.—3,5-DIAMINO-6-CHLOROPYRAZINOYLGUANIDINE

Step A:—Preparation of 3,5-diamino-6-chloropyrazinimidoylguanidine

Sodium (460 mg., 0.02 mole) is dissolved in anhydrous isopropyl alcohol (50 ml.). The solution is cooled, and dried pulverized quanidine hydrochloride (1.9 g., 0.02 mole) is added an the mixture is stirred mechanically and refluxed for 30 minutes. After cooling and removing the precipitated sodium chloride by filtration, the filtrate is treated with 3,5-diamino-6-chloropyrazinonitrile (0.01 mole). The mixture is stirred mechanically for 2 hours at room temperature and the solvent is then removed by reduced pressure distillation at room temperature. The resulting solid is suspended in a little water, filtered, washed with water and dried, yielding 1.25 g. of 3,5-diamino-6-chloropyrazinimidoylguanidine. The compound is purified by suspending in water, dissolving by adding dilute hydrochloric acid, filtering, precipitating with dilute sodium hydroxide, collecting by filtration, washing with water and drying.

Step B.—Preparation of 3,5-diamino-6-chloropyrazinoylguanidine 3,5-diamino-6-chloropyrazinimidoylguanidine (1 mole) is dissolved in 1 liter of 2 N hydrochloric acid. After standing 2 hours at ambient temperature, the crystalline product of 3,5-diamino-6-chloropyrazinoylguanidine hydorchloride separates out. It is collected on a filter, washed with cold water and dried. It has M.P. 293.5° C. (decomp.).

Other 3-amino-5-$NR^1R^2$ - 6-halopyrazinoylguanidine compounds prepared by the process of this invention are described in the following table of examples. The products are prepared following substantially the same process described in Example 1, Step B, except that the 3,5-diamino-6-chloropyrazinimidoylguanidine employed in Example 1, Step B, is replaced by the 3-amino-5$NR^1R^2$-6-halopyrazinimidoylguanidine having the variable $R^1$, $R^2$, $R^3$ and $R^4$ as defined in the following table. All other reagents and reaction conditions for the preparation of the product are as described in Example 1, Step B, although the modifications hereinbefore described can be incorporated to ultimately give the desired (3-amino-5-$NR^1R^2$-6-halo pyrazinoyl)-3-$R^3$-3-$R^4$-guanidines also defined in the following table.

(d) lower(cycloalkyl-alkyl);
$R^2$ is a member selected from the group consisting of
  (a) hydrogen, and
  (b) lower alkyl;
$R^3$ is a member selected from the group consisting of
  (a) hydrogen,
  (b) lower alkyl,
  (c) hydroxy-lower alkyl, and
  (d) phenyl-lower alkyl;
$R^4$ is a member selected from the group consisting of
  (a) hydrogen, and
  (b) lower alkyl; and
X is halo.

2. The process as claimed in claim 1 wherein the mineral acid is hydrochloric acid.

3. The process as claimed in claim 1 wherein $R^1$, $R^2$, $R^3$ and $R^4$ are hydrogen.

4. The process as claimed in claim 3 wherein X is chloro.

| Ex. | $R^1$ | $R^2$ | $R^3$ | $R^4$ | X | M.P (° C.) |
|---|---|---|---|---|---|---|
| 2 | $CH_3$— | $CH_3$— | H | H | Cl | 216–217 |
| 3 | H | H | $HO(CH_2)_2$— | H | Cl | [1] 228.5–229.5 |
| 4 | $i$-$C_3H_7$— | H | $CH_3$ | $CH_3$— | Cl | 238.5–240 |
| 5 | 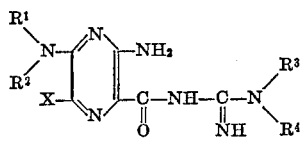—$CH_2$— | H | H | H | Cl | 220–221 |
| 6 | $CH_2$=CH—$CH_2$— | $CH_3$— | H | H | Cl | 207–208 |
| 7 | $C_2H_5$— | $C_2H_5$— | $CH_3$— | $CH_3$— | Cl | 212–214 |
| 8 | $i$-$C_3H_7$— | H | $HO)CH_2)_2$— | H | Cl | [2] 185–186 |

[1] HCl.  [2] HCl·½($H_2O$).

What is claimed is:
1. A process for the preparation of a compound of structural formula which comprises the treatment of a compound of structural formula

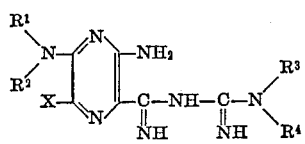

with a mineral acid wherein
$R^1$ is a member selected from the group consisting of
  (a) hydrogen,
  (b) lower alkyl,
  (c) lower alkenyl, and

References Cited

UNITED STATES PATENTS 3,361,748  1/1968  Chagoe et al. _____ 260—250

NICHOLAS S. RIZZO, *Primary Examiner.*

U.S Cl. X.R.

260—999